United States Patent
Joshi et al.

(10) Patent No.: US 11,859,536 B2
(45) Date of Patent: Jan. 2, 2024

(54) AIR SYSTEM OF MULTI-ENGINE AIRCRAFT

(71) Applicant: PRATT & WHITNEY CANADA CORP., Longueuil (CA)

(72) Inventors: Ninad Joshi, Brampton (CA); Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 504 days.

(21) Appl. No.: 16/672,977

(22) Filed: Nov. 4, 2019

(65) Prior Publication Data

US 2020/0378317 A1   Dec. 3, 2020

Related U.S. Application Data (60) Provisional application No. 62/855,131, filed on May 31, 2019.

(51) Int. Cl.
*F02C 9/42* (2006.01)
*F02C 9/18* (2006.01)

(52) U.S. Cl.
CPC .............. *F02C 9/42* (2013.01); *F02C 9/18* (2013.01); *F05D 2220/323* (2013.01)

(58) Field of Classification Search
CPC ...... F02C 9/42; F02C 9/18; F02C 6/08; F02C 6/00; F05D 2220/323; F23R 2900/00014
See application file for complete search history.

(56) References Cited

U.S. PATENT DOCUMENTS

| | | | |
|---|---|---|---|
| 3,192,848 A | 7/1965 | Townsend | |
| 5,429,208 A * | 7/1995 | Largillier | F01D 25/20 60/39.08 |
| 6,609,489 B1* | 8/2003 | Slopsema | F02M 35/1261 123/184.57 |
| 8,381,871 B1 | 2/2013 | Hellie et al. | |
| 2004/0168427 A1 | 9/2004 | Truco et al. | |
| 2016/0153361 A1* | 6/2016 | Morin | F02C 3/13 137/343 |
| 2017/0096233 A1* | 4/2017 | Mercier-Calvairac | F02C 9/42 |
| 2018/0022465 A1 | 1/2018 | Gelwan et al. | |
| 2018/0080378 A1* | 3/2018 | Alecu | F02C 9/42 |
| 2019/0093565 A1 | 3/2019 | Joshi et al. | |
| 2019/0249580 A1* | 8/2019 | Nguyen Hung | F01N 1/023 |
| 2019/0368417 A1* | 12/2019 | Terwilliger | F02C 7/36 |

OTHER PUBLICATIONS

European Search Report for Application No. 20175924.8 dated Mar. 2, 2021.

* cited by examiner

*Primary Examiner* — Todd E Manahan
*Assistant Examiner* — Rodolphe Andre Chabreyrie
(74) *Attorney, Agent, or Firm* — NORTON ROSE FULBRIGHT CANADA LLP (57) ABSTRACT

A multi-engine aircraft includes first and second gas turbine engines for providing motive power to the aircraft, each of the first and second engines comprising an air system, an air pressure line extending between and fluidly connecting the air systems of the first and second engines, and a pressure wave damper communicating with the air pressure line extending between the first and second engines.

13 Claims, 7 Drawing Sheets

AIR SYSTEM OF MULTI-ENGINE AIRCRAFT

CROSS-REFERENCE

The present application claims the benefit of priority of U.S. Application No. 62/855,131, filed May 31, 2019, entitled "AIR SYSTEM OF MULTI-ENGINE AIRCRAFT", incorporated expressly herein by reference in its entirety.

TECHNICAL FIELD

The application relates generally to air systems of multi-engine aircraft.

BACKGROUND OF THE ART

Helicopters may have two or more engines powering a main rotor via a common reduction gearbox, and each of the engines is typically sized such that the power of each engine is greater than what is required by the helicopter in cruise. Improving operating fuel efficiencies of such multi-engine systems is desirable.

SUMMARY

In an aspect, there is provided a multi-engine aircraft, comprising: first and second gas turbine engines for providing motive power to the aircraft, each of the first and second engines comprising an air system; an air pressure line extending between and fluidly connecting the air systems of the first and second engines; and a pressure wave damper communicating with the air pressure line extending between the first and second engines.

In some embodiments, the first engine and/or the second engine is configured for standby operation in-flight.

In some embodiments, the air pressure line includes a control valve operable to fluidly block and fluidly unblock the air pressure line.

In some embodiments, the pressure wave damper connects to the air pressure line at a location proximate to the control valve, and neck dimensions of the pressure wave damper are tuned to resonate with a volume of the pressure wave damper at a most prevalent excitation frequency and/or an Eigen frequency of the air pressure line, to dissipate energy imparted to the air pressure line via operation of the control valve prior to distressing the air pressure line.

In some embodiments, the location corresponds to a pressure wave maximum experienced by the air pressure line during operation of the aircraft.

In some embodiments, the pressure wave maximum is calculated as a maximum air pressure in the air pressure line when the control valve switches between one of: i) from fluidly blocking the air pressure line to fluidly unblocking the air pressure line, and ii) from fluidly unblocking the air pressure line to fluidly blocking the air pressure line.

In some embodiments, the pressure wave damper communicating with the air pressure line is a plurality of pressure wave dampers communicating with a plurality of air pressure lines that are part of the air systems of the first and second engines, each of the plurality of pressure wave dampers being disposed at a location corresponding to a pressure wave maximum of an air pressure line of the plurality of air pressure lines corresponding to that pressure wave damper.

In some embodiments, the pressure wave damper comprises a neck and a resonator volume, the neck fluidly connects the resonator volume to the air pressure line, and dimensions of the neck and the resonator volume are configured to attenuate a frequency of a pressure wave in the air pressure line.

In another aspect, there is provided an aircraft, comprising: a first engine having a bleed air system; a second engine having a bleed air system; a source of pressurized air that is external to the first engine and/or the second engine, the source of pressurized air being selectively fluidly connectable to the bleed air system of the at least one of the first and the second engine via a plurality of air conduits; and a pressure wave damper fluidly connected to at least one of the plurality of air conduits between the bleed air systems of the first and second engines.

In some embodiments, the aircraft further includes at least one control valve disposed fluidly between the source of pressurized air and the bleed air system of the at least one of the first and the second engine, the at least one control valve being operable to selectively fluidly connect the source of pressurized air to the bleed air system of the at least one of the first and the second engine, and wherein the pressure wave damper is disposed fluidly proximate to the at least one control valve.

In some embodiments, at least one of the first and second engines is configured to operate in a sub-idle mode while another one of the first and second engines is operating in an active mode.

In some embodiments, each of the first and the second engine is operable in any one of a standby mode and an active mode, and the source of pressurized air is: a) the bleed air system of the second engine when the first engine is operating in the standby mode, b) the bleed air system of the first engine when the second engine is operating in the standby mode.

In some embodiments, the aircraft further includes a second source of pressurized air that is external to both the first and the second engine, the second source of pressurized air being selectively fluidly connectable simultaneously to both first and the second engine, and the pressure wave damper is a plurality of pressure wave dampers that includes a first pressure wave damper disposed fluidly between the second source of pressurized air and the bleed air system of the first engine, and a second pressure wave damper disposed fluidly between the second source of pressurized air and the bleed air system of the second engine.

In some embodiments, the second source of pressurized air is an auxiliary power unit of the aircraft.

In some embodiments, the second source of pressurized air is an air compressor of the aircraft.

In another aspect, there is provided an engine system of a multi-engine aircraft, comprising: a first engine operable in an active mode to provide motive power to the aircraft and in a standby mode in which the first engine provides substantially no motive power to the aircraft, the first engine having a first bleed air system enabling operation of the first engine in the active mode; a second engine operable in an active mode to provide motive power to the aircraft and in a standby mode in which the first engine provides substantially no motive power to the aircraft, the second engine having a second bleed air system enabling operation of the second engine in the active mode; an air system operatively connected to the first and second bleed air systems to selectively execute any one of: i) fluidly connect the first and second bleed air systems to each other, and ii) fluidly disconnect the first and second bleed air systems from each other; and a pressure wave damper positioned in the air system so as to absorb at least a part of air pressure fluctuations generated in the air system during a switch over of the air system between: i) fluidly connecting the first and second bleed air systems to each other, and ii) fluidly disconnecting the first and second bleed air systems from each other.

In some embodiments, the air system comprises at least one control valve for executing the any one of i) fluidly connecting the first and second bleed air systems to each other, and ii) fluidly disconnecting the first and second bleed air systems from each other; and the pressure wave damper is positioned fluidly proximate to the at least one control valve.

In some embodiments, the air system comprises a first control valve operable to selectively connect the first and second bleed air systems to each other, and the pressure wave damper is a plurality of pressure wave dampers that includes a first pressure wave damper disposed fluidly between the first control valve and the first bleed air system, and a second pressure wave damper disposed fluidly between the first control valve and the second bleed air system.

In some embodiments, the air system comprises a second control valve operable to selectively connect the first bleed air system to a source of pressurized air external to both the first and second engines, a third control valve operable to selectively connect the second bleed air system to the source of pressurized air, the plurality of pressure wave dampers includes a third pressure wave damper disposed fluidly between the second control valve and the first bleed air system, and a fourth pressure wave damper disposed fluidly between the third control valve and the second bleed air system.

In some embodiments, the source of pressurized air is one of: an auxiliary power unit (APU) and an air compressor.

BRIEF DESCRIPTION OF THE DRAWINGS

Reference is now made to the accompanying figures in which.

DETAILED DESCRIPTION

Bleed air produced by a gas turbine engine of an aircraft is compressed air from the compressor stage that is used for various functions of that engine (such as cooling of turbines and to help seal bearing cavities, for example). Bleed air may also be used for aircraft functions (such as engine starting, cabin pressure, air systems, pressurizing liquid tanks, etc.). Engine bleed air can be derived from the high pressure or the low pressure compressor stage, depending on the air pressure requirements and the engine operating condition.

In at least some multi-engine aircraft, such as helicopters, prior art bleed systems may not be capable of supplying an adequate flowrate and/or pressure of bleed air in some operating conditions, such as when a gas turbine engine providing the bleed air is operating in a standby mode. For the purposes of this document, the terms "standby" and "sub-idle" are used with respect to a given engine to mean that the given engine is operating but is providing materially no motive power to the aircraft with which it is used, with the "sub-idle" operation being a particular type of standby operation according to the present technology as described in this document.

The present technology has been developed in view of this finding, and provides for a secondary compressed air system may provide compressed air to one or more of an aircraft's engines while the engine(s) is/are in a standby or a sub-idle mode. With the development of the present compressed air system technology, it has been further discovered by the developers that at least when applied to some aircraft, the compressed air system may have plumbing lengths that are sufficiently long to be potentially affected by standing wave resonances, pressure pulsations, vibrations, noise and other stresses. It has been found that such additional stresses may pose a risk in at least some cases of premature deterioration of one or more of the compressed air system components.

Figure 1:
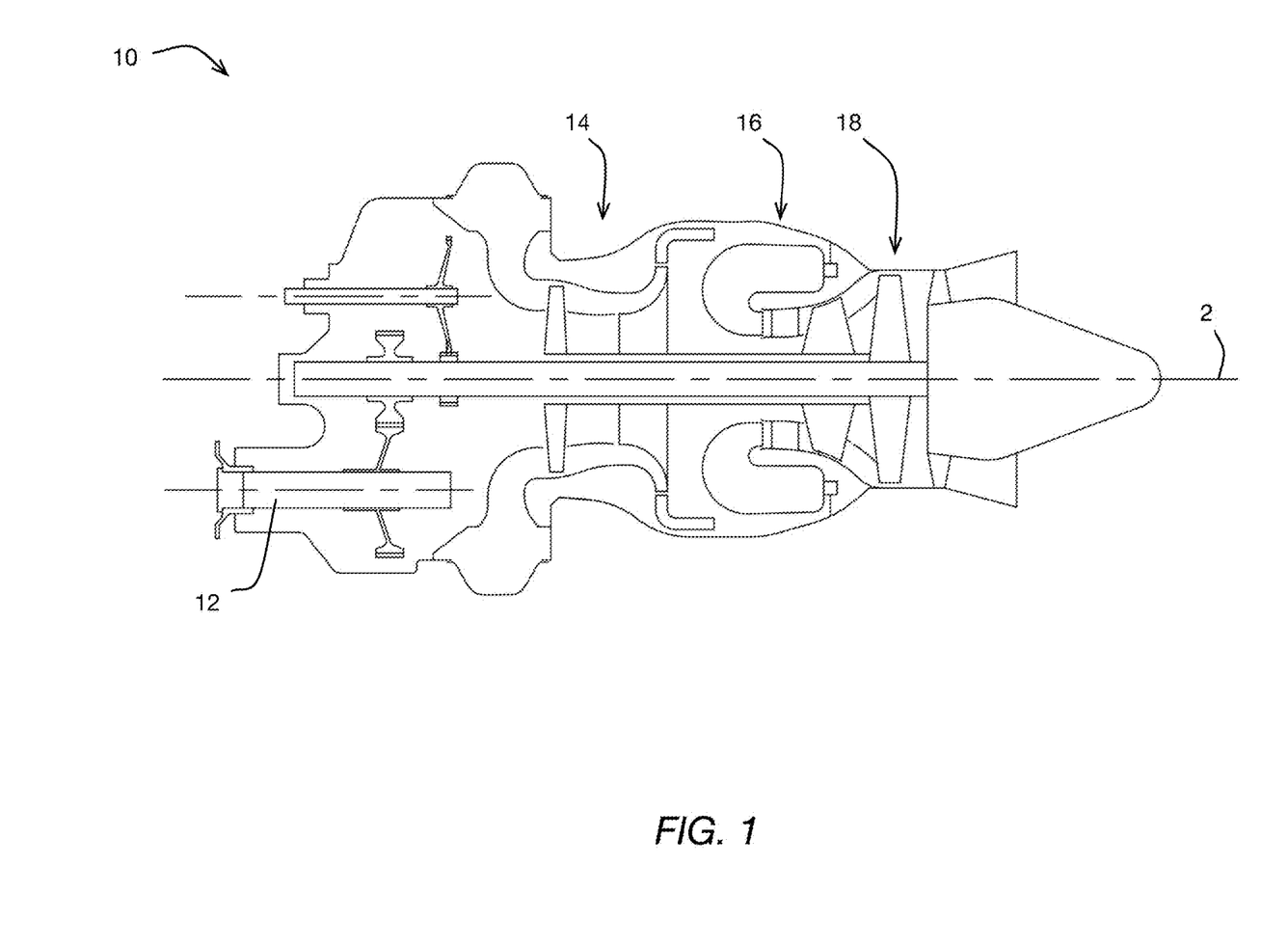
FIG. 1 is a schematic cross sectional view of a gas turbine engine.

FIG. 1 illustrates an aircraft engine 10 of a type preferably provided for use in subsonic flight, generally comprising a shaft 12 operatively connectable to a fan or other rotor, such as a helicopter rotor, for propelling ambient air, and in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. Components of the engine 10 are rotatable about a longitudinal center axis 2 of the engine 10. In the present embodiment, the engine 10 is a turboshaft engine. It is contemplated that the engine 10 could be a different type of engine, such as a rotary engine, a turboprop, or a turbofan engine for example.

Figure 2:
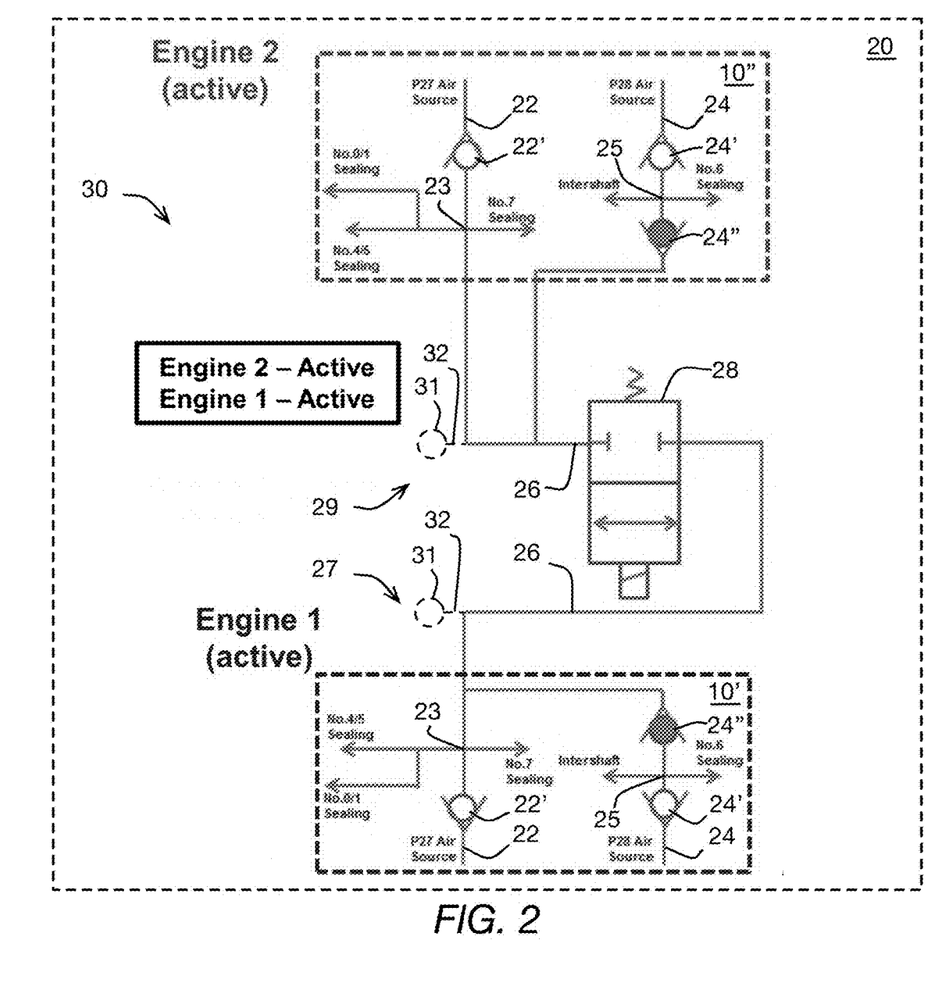
FIG. 2 is a schematic of two gas turbine engines and of an air system of an aircraft, with both of the engines being active.

FIG. 2 schematically illustrates an aircraft 20, in this example a helicopter, having a first engine 10', and a second engine 10". The engines 10', 10" are operable to provide motive power to the aircraft 20 via conventional transmission systems and controls. For simplicity, only the non-conventional aspects of the present technology are described in detail in this document. In this embodiment, each of the engines 10', 10" is substantially the same as engine 10 shown in FIG. 1 and described above. Therefore, only the first engine 10' is described in further detail. Parts of the second engine 10" that correspond to parts of the first engine 10' are labeled with the same numerals.

As shown schematically in FIG. 2, the first engine 10' includes a first bleed air conduit 22 and a second bleed air conduit 24, both of which bleed compressed air from respective parts of the compressor section 14 of the first engine 10'. In the present embodiment, the first bleed air conduit 22 includes a check valve 24' and branches off into supply bleed air conduits 23 downstream of the check valve. In this embodiment, the second bleed air conduit 24 includes a check valve 24' and a check valve 22'. The second bleed air conduit 24 branches off into supply bleed air conduits 25 at one or more locations that are fluidly in between the check valves 24', 24". As shown, the check valves 24', 24" are pointing toward each other, for purposes explained below.

The supply bleed air conduits 23, 25 deliver bleed air to various sealing systems of the first engine 10'. The particular number and configuration of the sealing systems may be any suitable number and configuration, and is therefore not described in detail. The supply bleed air conduits 23 and 25 may also provide bleed air for various other functions of the first engine 10' and/or the aircraft. Examples of such functions include, but are not limited to, cooling of turbines, provision of environmental control of the cabin, operation of air systems, and pressurizing liquid tanks. Any suitable air piping and controls arrangement may be used to provide for each particular combination of the functions provided for by the bleed air from the first and second bleed air conduits 22, 24.

Still referring to FIG. 2, the first and second bleed air conduits 22, 24 of the first engine 10' fluidly converge/join into a common bleed air conduit 26. The common bleed air conduit 26 fluidly connects to a control valve 28. The control valve 28 may be any suitable one or more control valves so long as it provides for the functionality described in this document. The conduits 22, 23, 24, 25, 26 and valves 22', 24', 24" of the first engine 10' are part of a bleed air system 27 of the first engine 10'. The rest of the bleed air system 27 may be conventional and is therefore not shown or described in detail herein.

As shown in FIG. 2, in the present embodiment, the bleed air system 29 of the second engine 10" is similar to the bleed air system 27 of the first engine 10', described above. Therefore, to maintain simplicity of this description, the bleed air system 29 of the second engine 10" is not described in detail. Suffice it to say that parts of the bleed air system 29 of the second engine 10" that correspond to parts of the bleed air system 27 of the first engine 10' are labeled with the same numerals.

As shown in FIG. 2, the common bleed air conduit 26 of the second engine 10", similar to the common bleed air conduit 26 of the first engine 10', fluidly connects to a control valve 28. The control valve 28 is operable by a controller of the aircraft 20 to selectively: i) fluidly connect the common bleed air conduit 26 of the first engine 10' to the common bleed air conduit 26 of the second engine 10", by fluidly unblocking the air pressure line that the control valve 28 is in, and ii) fluidly disconnect the common bleed air conduit 26 of the first engine 10' from the common bleed air conduit 26 of the second engine 10", by fluidly blocking the air pressure line that the control valve 28 is in, as illustrated by the internal structure of the control valve 28 schematically shown in FIG. 2. The control valve 28 may be actuated using any suitable actuator of the engines 10', 10" and/or of the aircraft 20.

FIG. 2 shows a first in-flight, mode of operation of the aircraft 20 during which both engines 10', 10" are "active" and are therefore both providing motive power to the aircraft 20. For the purposes of this document, the term "active" used with respect to a given engine means that the given engine is providing motive power to the aircraft with which it is used.

In this operating condition, the bleed air system 27 of the first engine 10' and the bleed air system 29 of the second engine 10" are both self-sufficient. For the purposes of this document, the term "self-sufficient" used with respect to a given bleed air system of a given engine means that the given bleed air system of the given engine provides all of its intended functions for the duration of the time during which it is called upon to provide for the functions. A given bleed air system of a given engine is not "self-sufficient" when one or more of the intended functions of the given bleed air system may be unavailable or unstable due to a lack of bleed air pressure and/or bleed air supply rate provided by the corresponding engine to the given bleed air system.

Figure 3:
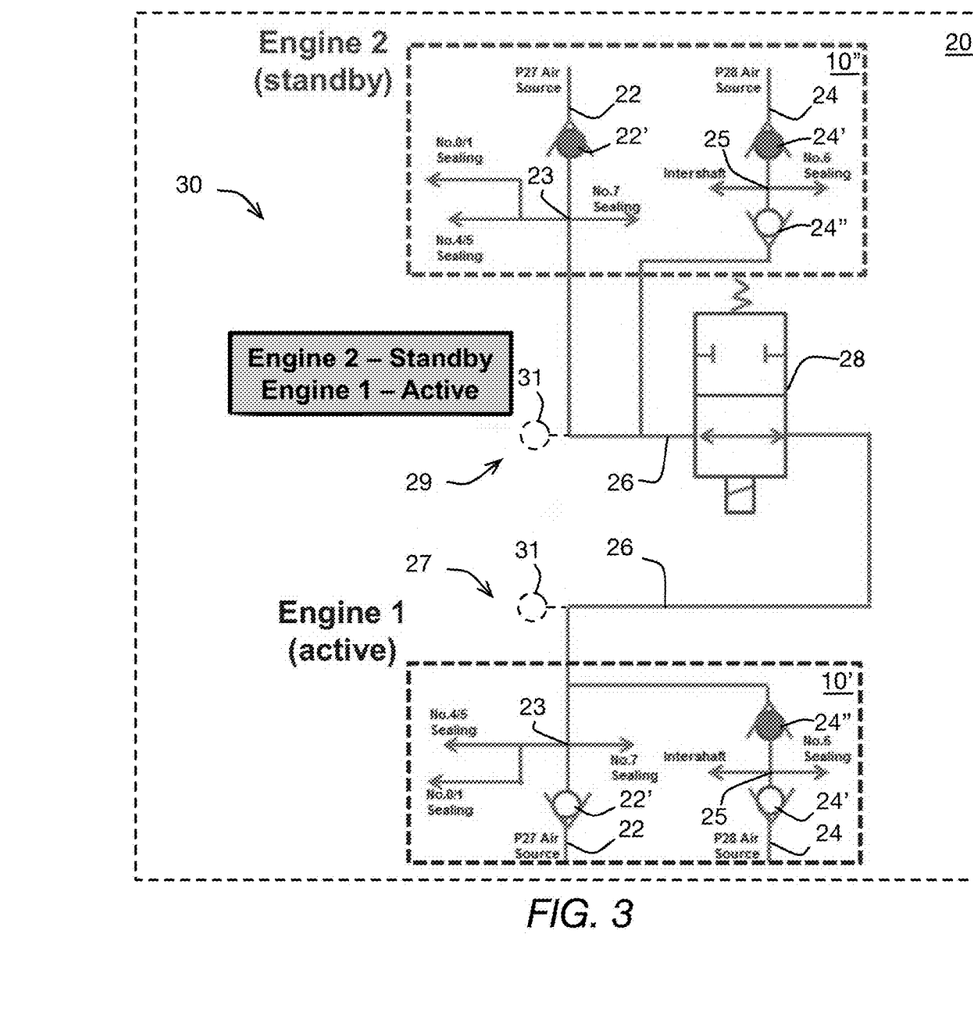
FIG. 3 is a schematic of the two gas turbine engines and of the air system of FIG. 2, with one of the engines being active and another one of the engines being on standby.

Reference is now made to FIG. 3, which shows a second in-flight, cruise, mode of operation of the aircraft 20 during which: i) the first engine 10' is "active" and is therefore providing motive power to the aircraft 20, and ii) the second engine 10" is on "standby" (a.k.a. operating in a standby mode) and is therefore not providing any material amount of motive power to the aircraft 20. In this operating mode (i.e. in the second in-flight mode of operation), the bleed air system 27 of the first engine 10' is self-sufficient. On the other hand, depending on each particular embodiment of the engines 10', 10" and/or the aircraft 20 and/or on the characteristics of the particular "standby" operation of the second engine 10", the bleed air system 29 of the second engine 10" may or may not be self-sufficient in the standby mode.

For this reason, during the second in-flight mode of operation of the aircraft 20, the control valve 28 may be actuated by a suitable controller of the aircraft 20 to fluidly connect the common bleed air conduit 26 of the first engine 10' to the common bleed air conduit 26 of the second engine 10", to provide for an additional supply of bleed air from the bleed air system 27 of the first engine 10' to the bleed air system 29 of the second engine 10". Self-sufficiency of the bleed air system 29 of the second engine 10" may thereby be provided. After the second engine 10" is brought into an "active" state while the first engine 10' is in an "active" state, the control valve 28 may be actuated by a suitable controller of the aircraft 20 to fluidly disconnect the common bleed air conduit 26 of the first engine 10' from the common bleed air conduit 26 of the second engine 10", as shown in FIG. 2. After the first engine 10' is put into a standby mode or a sub-idle mode while the second engine 10" is in an "active" mode, the control valve 28 may be actuated by a suitable controller of the aircraft 20 to fluidly connect the common bleed air conduit 26 of the first engine 10' to the common bleed air conduit 26 of the second engine 10". The bleed air system 29 of the second engine 10" may thereby provide compressed air to the bleed air system 27 of the first engine 10'. Self-sufficiency of the bleed air system 27 of the first engine 10' may thereby be provided.

The bleed air systems 27, 29 of the engines 10', 10" and the control valve 28 are part of an air system 30 of the aircraft 20. As described above, the air system 30 of the aircraft 20 implemented according to the present technology may thereby provide for self-sufficient operation of at least one of the engines 10', 10" in at least some operating conditions of the aircraft 20 in which at least some prior art engine bleed air systems may not be self-sufficient.

Further, as shown in FIGS. 2 and 3 for example, in the present embodiment, the check valves 24' and 24" are provided in the bleed air conduits 24, downstream of the branching-out bleed air conduits 25. In this embodiment, this the branching-out bleed air conduits 25 may supply compressed air to at least some subsystems of the respective engines 10', 10". Each of the check valves 24' and 24" ensures that when the engine 10', 10" having that check valve 24', 24" is providing compressed air from its bleed air system 27, 29 to the bleed air system 27, 29 of the other engine 10', 10", the compressed air is provided from the air source corresponding to the bleed air conduit 22 of that engine 10', 10". The check valves 24' and 24" therefore help ensure uncompromised self-sufficient operation of the subsystems of the one of the engines 10', 10" that may at a given time be providing compressed air to the other one of the engines 10', 10". In some embodiments, the check valve 24' and/or the check valve 24" may be omitted.

The rest of the air system 30 that is not shown in the figures of the present application may be conventional and is therefore not described in detail herein. Any suitable controls and any suitable control logic may be used to provide for the functionality of the air system 30, and/or for various timings of actuation of the control valve 28 relative to switches between "active" and "standby" states that may occur with respect to each of the engines 10', 10" during in-flight or ground operations of the aircraft 20.

Figure 4:
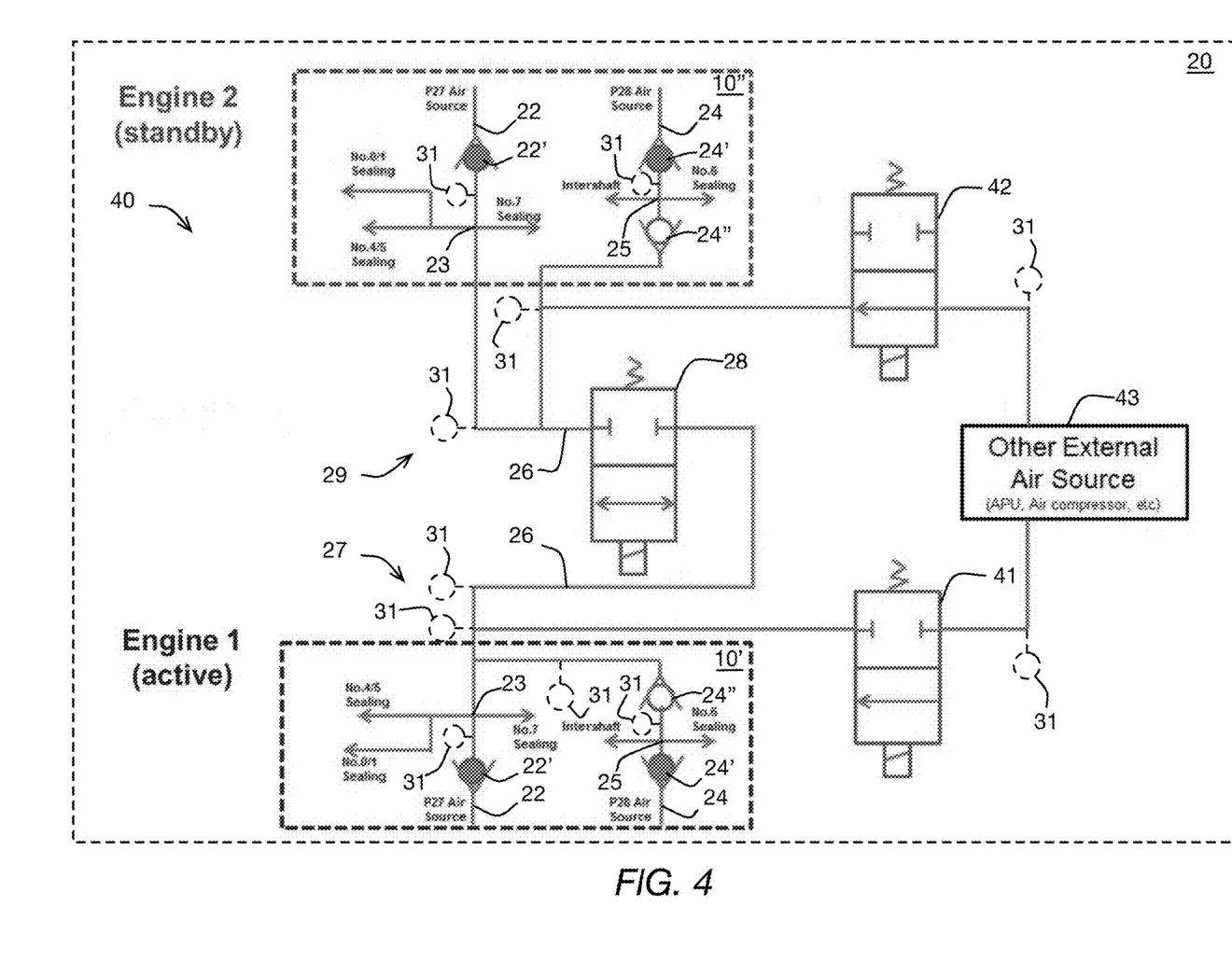
FIG. 4 is a schematic of two gas turbine engines and of the air system of the aircraft of FIG. 2, the air system being implement according to another embodiment.

Referring now to FIG. 4, an air system 40 of the aircraft 20, which is an alternative embodiment of the air system 30 is shown. The air system 40 is similar to the air system 30, and therefore similar reference numerals have been used for the air system 40. A difference of the air system 40 from the air system 30, is that air system 40 includes a control valve 41, a control valve 42, and an external compressed air source 43 such as an auxiliary power unit (APU) and/or an air compressor for example. The external compressed air source 43 may be any conventional external compressed air source suitable for each particular embodiment of the engines 10', 10" and the aircraft 20.

The control valve 41 selectively fluidly connects the external compressed air source 43 to the common bleed air conduit 26 of the first engine 10', via any suitable corresponding air conduits. More particularly, when the first engine 10' is "active", the control valve 41 may be actuated by a suitable controller of the aircraft 20 to fluidly disconnect the external compressed air source 43 from the common bleed air conduit 26 of the first engine 10', and may thereby allow the bleed air system 27 of the first engine 10' to run self-sufficiently.

When the first engine 10' is on "standby", the control valve 41 may be actuated by a suitable controller of the aircraft 20 to fluidly connect the external compressed air source 43 to the common bleed air conduit 26 of the first engine 10'. The control valve 41 may thereby provide "supplemental" compressed air to the bleed air system 27 of the first engine 10' at a supply rate and pressure sufficient to allow the bleed air system 27 of the first engine 10' to provide for all of its intended functions during the "standby" operation of the first engine 10'. The control valve 41, via corresponding air conduit(s), may selectively fluidly connect the external compressed air source 43 to a different part of the bleed air system 27 of the first engine 10', so long as the functionality described above is provided.

The control valve 42 similarly fluidly connects the external compressed air source 43 to the common bleed air conduit 26 of the second engine 10", and is actuated according to a similar control logic to allow the bleed air system 29 of the second engine 10" to provide for all of its intended functions during the "standby" operation of the second engine 10". As shown, the control valve 28 that fluidly connects the bleed air system 27 of the first engine 10' to the bleed air system 29 of the second engine 10" may be in a position in which it fluidly disconnects the first engine 10' from the second engine 10", to allow for the supplemental compressed air to be provided to either one, or to both, of the engines 10', 10" by the external compressed air source 43. In some embodiments, the control valves 28, 41, 42 may be actuated correspondingly to switch between the various possible supply modes of air described above. For example, in some operating conditions, the bleed air system 27, 29 of one of the engines 10', 10" may receive "supplemental" compressed air from one or both of: i) the bleed air system 27, 29 of another one of the engines 10', 10", and ii) the external compressed air source 43.

Figure 5:
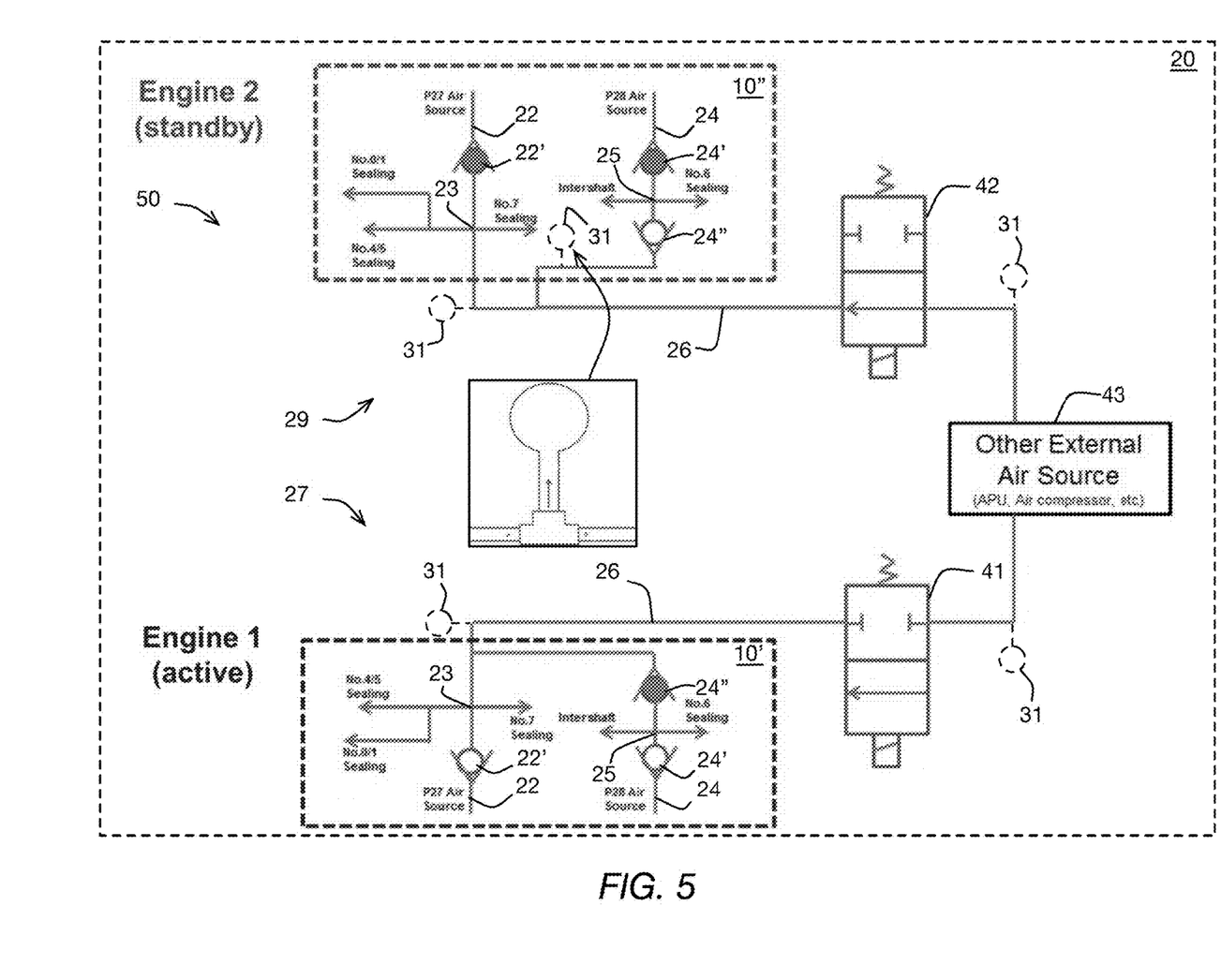
FIG. 5 is a schematic of two gas turbine engines and of the air system of the aircraft of FIG. 2, the air system being implement according to yet another embodiment.

Referring now to FIG. 5, an air system 50 of the aircraft 20, which is yet another alternative embodiment of the air system 30 is shown. The air system 50 is similar to the air system 40, and therefore similar reference numerals have been used for the air system 50. A of the air system 50 difference from the air system 40, is that air system 50 does not have a control valve 28 for fluidly connecting the bleed air system 27 of the first engine 10' to the bleed air system 29 of the second engine 10". Operation of the air system 50 is similar to operation of the air system 40 with respect to the external compressed air source 43.

In at least some embodiments and applications, the air systems 30, 40, 50 may allow to provide "supplemental" compressed air to the bleed air system 27, 29 of one of the engines 10', 10" in at least some cases where that bleed air system 27, 29 is malfunctioning and/or leaking air for example. A person skilled in the art will appreciate that while a particular air conduit arrangement is shown in FIGS. 1 to 5, other air conduit arrangements may be used while providing for at least some of the functionality described in this document. While a single external compressed air source 43 is used in the embodiments of FIGS. 4 and 5, multiple different external compressed air sources may be used. Likewise, while the example aircraft 20 has two engines 10', 10", the present technology may be implemented with respect to more than two engines and/or with respect to other types of engines.

Figure 6:
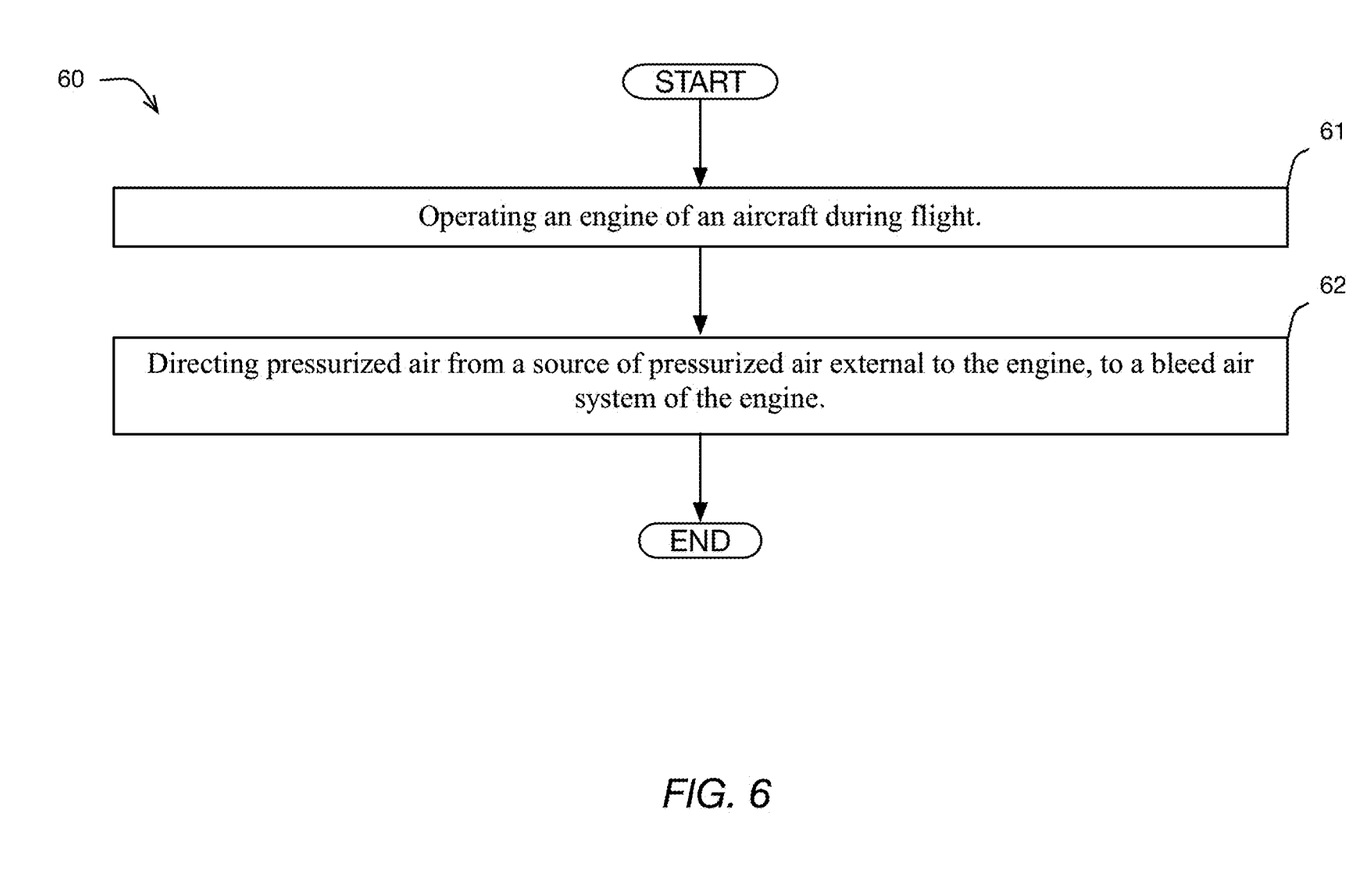
FIG. 6 is a schematic logic diagram showing a method implemented according to an embodiment of the present technology.

With the above systems in mind, the present technology provides a method 60 of using, in flight, a source of pressurized air external to an engine of an aircraft 20. As seen above, in some embodiments and operating conditions, the source of pressurized air may be one of the engines 10', 10" of the aircraft 20, and in some embodiments, an APU 43 or air compressor 43 of the aircraft 20. In some embodiments, the method 60 includes a step 61 of operating a given engine 10', 10" of the aircraft 20 during flight. In some embodiments, the method 60 also includes a step 62 of directing pressurized air from the source of pressurized air external to the given engine 10', 10", to a bleed air system 27, 29 of the given engine 10', 10".

In some embodiments, the given engine 10', 10" to which pressurized air is directed is a first engine 10' of the aircraft 20, the aircraft 20 includes a second engine 10", and the source of pressurized air external to the first engine 10' is a bleed air system 29 of the second engine 10". As seen above, in some embodiments, the aircraft 20 is a multi-engine helicopter in which the engines 10', 10" are operatively connected to drive at least one main rotor of the helicopter to provide motive power to/propel the helicopter.

As seen above, in some embodiments, the directing pressurized air to the bleed air system 27 of the first engine 10' is executed when the first engine 10' is operating on standby. In embodiments in which the source of the pressurized air is the bleed air system 29 of the second engine 10", the second engine 10" is active (i.e. providing motive power to the helicopter). Similarly, in some operating conditions during flight, the given engine 10', 10" to which pressurized air is directed is a second engine 10" of the aircraft 20. In some such cases, the source of pressurized air external to the second engine 10" is a bleed air system 27 of the first engine 10'. In some such cases, the second engine 10" is on standby while the first engine 10' providing the compressed air is active (i.e. providing motive power to the helicopter).

As seen above, in some embodiments, the source of pressurized air is a first source of pressurized air (e.g. first engine 10' or second engine 10", depending on which of these engines is active and which is on standby), the aircraft 20 includes a second source of pressurized air (e.g. APU/air compressor 43 of the aircraft 20). In some such embodiments, the second source of pressurized air 43 is external to both the first engine 10' and the second engine 10". In some such embodiments and in some flight conditions, the method 60 comprises directing pressurized air from the second source of pressurized air 43 to the first engine 10'. In some such embodiments and in some flight conditions, the method 60 comprises directing pressurized air from the second source of pressurized air 43 to the second engine 10". Further in some such embodiments and in some flight conditions, the method 60 comprises directing pressurized air from the second source of pressurized air 43 to both the first engine 10' and the second engine 10".

Figure 7:
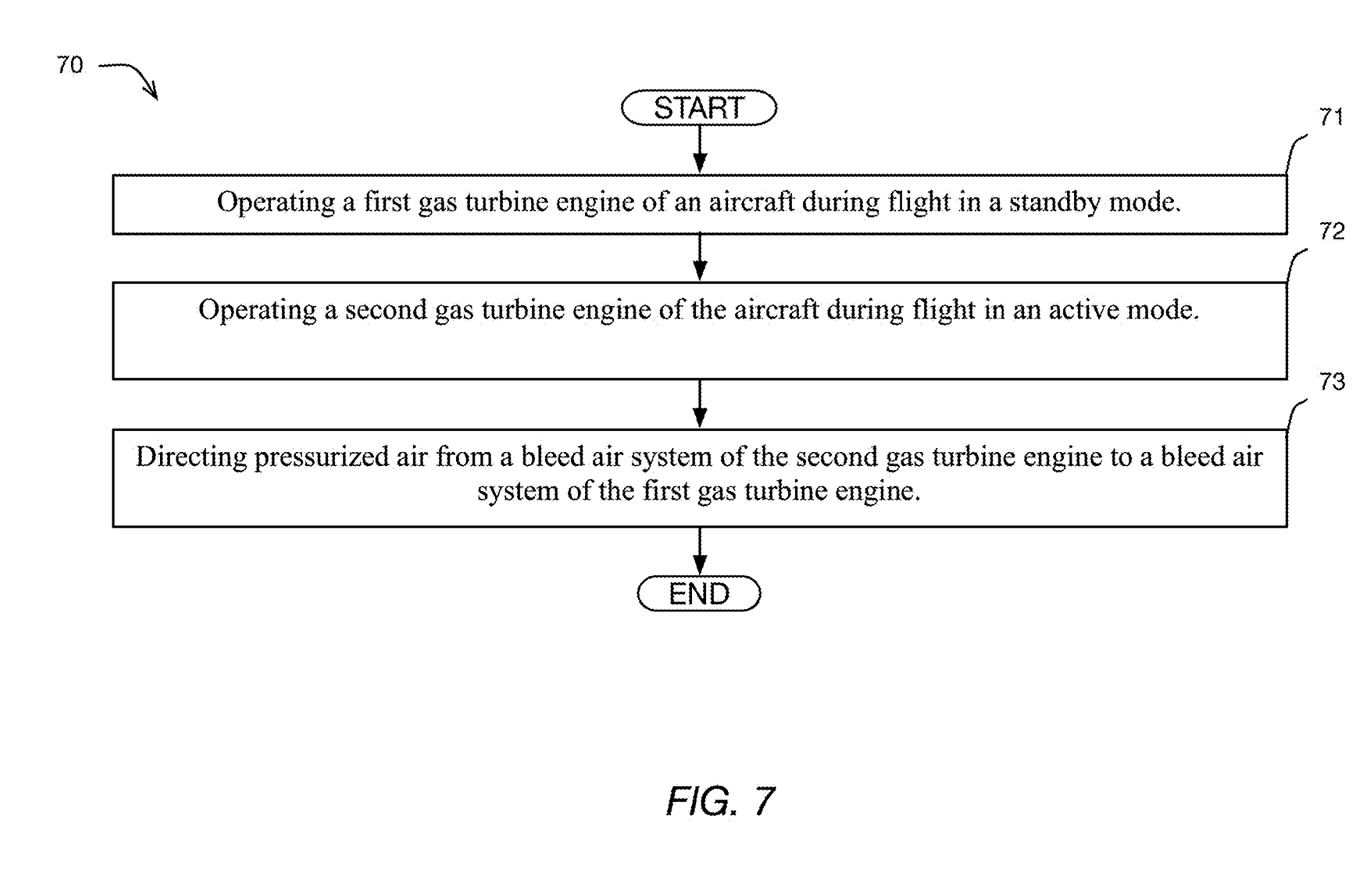
FIG. 7 is a schematic logic diagram showing a method implemented according to another embodiment of the present technology.

Further with the structure of the aircraft 20 described above, the present technology also provides method 70 of operating a bleed air system 27 of a first gas turbine engine 10' of a multi-engine aircraft 20 during flight. In some embodiments, the method 70 comprises a step 71 of operating the first gas turbine engine 10' of the aircraft 20 during flight in a standby mode, such as an idle or a sub-idle mode that provides either no motive power or at least materially no motive power to the aircraft 20. In some embodiments, the method 70 comprises a step 71 of operating a second gas turbine engine 10" of the aircraft 20 during flight in an active mode (i.e. providing non-substantially-zero motive power to the aircraft 20).

In some cases, the steps 71 and 72 are executed simultaneously. In some such cases, the method 70 comprises directing pressurized air from a bleed air system 29 of the second gas turbine engine 10" to a bleed air system 27 of the first gas turbine engine 10'.

In some cases, the method 70 further includes a step 73 of operating a source of pressurized air (E.g. APU/air compressor 43, and the like) of the aircraft 20 external to both the first gas turbine engine 10' and the second gas turbine engine 10", and a step of directing pressurized air from the source of pressurized air 43 to at least one of the first gas turbine engine 10' and the second gas turbine engine 10".

In some cases, the directing pressurized air from one of the bleed air systems 27, 29 to the other one of the bleed air systems 27, 29 (depending on which one of the bleed air systems 27, 29 requires supplemental compressed air) may be executed simultaneously with directing pressurized air from a second source of pressurized air to the one of the bleed air systems 27, 29 that is receiving the supplemental compressed air. In some embodiments, the second source of pressurized air 43 includes, or is, at least one of: an APU 43 of the aircraft 20, and an air compressor 43 of the aircraft 20.

In some such cases, the air pressure in the one of the bleed air systems 27, 29 receiving supplemental compressed air may be lower than the pressure of the supplemental compressed air. It is contemplated that any suitable controls and control arrangements may be used to provide for this pressure differential, where required. While two engines 10', 10" of an aircraft 20 are described, it is contemplated that the present technology could be implemented with regard to a larger number of engines of an aircraft to provide supplemental compressed air from one or more of the engines or other compressed air source(s), to one or more other ones of the engines.

The air systems 30, 40, 50 described above may help improve switching between active modes of operation and the sub-idle modes of operation of one or more engines of a multi-engine aircraft, as the sub-idle modes are described in the commonly owned U.S. patent application Ser. No. 16/560,365, entitled "CONTROL LOGIC FOR GAS TURBINE ENGINE FUEL ECONOMY", filed Sep. 4, 2019, and incorporated by reference herein in its entirety. Now referring back to FIGS. 2 to 5, in some embodiments, the air systems 30, 40, 50 may further comprise one or more pressure wave dampers 31 in air communication with one or more of the air pressure lines/conduits 22-26. A non-limiting example of one of the pressure wave dampers 31 is shown in detail in FIG. 5. The term "pressure wave damper" as used herein includes all devices that may in the present art be referred to as a pressure wave arrestor, pressure wave suppressor, pressure wave attenuator, and the like, and their equivalents including one or more branch pipes configured to filter out one or more frequencies associated with the unwanted pressure waves. The pressure wave damper(s) 31 may absorb and/or dampen and/or attenuate at least some of the pressure waves/pulses/air pressure fluctuations/pulsations in the air pressure line(s)/conduit(s) 22-26 that may be generated during operation of the air systems 30, 40, 50, such as through executing the various methods 60, 70 described above for example.

In at least some cases, like steady state operation, this may help reduce a likelihood of standing wave resonances in the air systems 30, 40, 50, and may help prolong an expected life cycle of the air systems 30, 40, 50. In at least some embodiments, at least some of the pressure wave dampers 31 are made large enough to act as resonators during steady state engine operation, thereby helping dissipate transient/surge pressure within the respective line(s) to which it/they are connected. For example, for effectiveness during a steady state operation, the neck dimensions (length and diameter) of a given pressure wave damper 31 may be tuned to resonate with the accompanying volume of the given pressure wave damper 31 at the most prevalent excitation frequency and/or an Eigen frequency of the corresponding air pressure line, to dissipate energy that may be imparted to the air pressure line, for example as a result of a control valve operation and/or a switchover of an engine from a standby mode to an active mode and/or vice versa, prior to distressing the air pressure line.

As shown, in some embodiments, the pressure wave damper(s) 31 may be fluidly connected into the air systems 30, 40, 50 at locations proximate to one or more of the valves, for example valves 22', 24', 24", 28, 41, 42, of the air systems 30, 40, 50. Also as shown, in some embodiments, the pressure wave damper(s) 31 may be fluidly connected into the air systems 30, 40, 50 at locations each of which may have been determined to correspond to an air pressure maxima, and/or a maximum of a pressure wave inside the corresponding duct(s), pipe(s) or other air conduit(s), in the respective air system 30, 40, 50. Such positioning may help further reduce a likelihood of, and in some embodiments and applications prevent, standing wave resonances in the air systems 30, 40, 50, and may further help prolong life of the air systems 30, 40, 50.

More particularly, the air pressure maximums may be determined at one or more switch-over conditions of the air systems 30, 40, 50, as described above (a.k.a. transient operation), during which the air systems 30, 40, 50 may switch, for example: a) from supplying one of the engines 10', 10" with supplemental compressed air to supplying another one of the engines 10', 10" with supplemental compressed air, or b) from not supplying any supplemental compressed air to any of the engines 10', 10" to supplying supplemental compressed air to at least one of the engines 10', 10". More particularly, for a given air pressure line having a control valve, such as one or more of the control valves 28, 41, 42 for example, the air pressure maximum, and/or the maximum of a pressure wave, may be calculated (e.g. by modeling) as a maximum air pressure in the air pressure line when the control valve switches between one of: i) from fluidly blocking the air pressure line to fluidly unblocking the air pressure line, and ii) from fluidly unblocking the air pressure line to fluidly blocking the air pressure line.

In some embodiments, one or more of the pressure wave damper 31 may be a Helmholtz resonator. In some embodiments, one or more of the pressure wave damper 31 may include a membrane/diaphragm that is fluidly and/or mechanically pressurized to enhance a frequency response of the respective air systems 30, 40, 50. In some embodiments, one or more of the pressure wave damper 31 may include a resonator volume that absorbs and/or attenuates and/or dissipates shockwaves and/or pressure oscillations and/or other aerodynamic instabilities. In some such embodiments, the resonator volume(s) may be spherical, cylindrical, or a 3D complex shape for example, and may be made sufficiently large to dissipate transient/surge pressure within the respective air lines, to assist in mitigating stresses during the transient operations of the air systems 30, 40, 50.

Also, in some embodiments, one or more of the pressure wave dampers 31 may include a neck 32 (numbered in FIG. 2 only, to preserve clarity of the figures) that fluidly connects the resonator volume(s) to the respective air lines. In some such embodiments, the resonator neck dimensions, including a length and diameter thereof, may be selected to resonate with the corresponding resonator volume(s) at a prevalent excitation frequency and/or at an Eigen frequency of the corresponding air line. In at least some cases, such dimensioning may help reduce stresses experienced by the respective air systems 30, 40, 50 during steady state operation. Also, in some embodiments, such as where a Helmohltz resonator is used, the Helmohltz resonator may have an opening having an opening area (A), a neck with a length (L), and a volume (V). In such embodiments, the resonator frequency response of the Helmohltz resonator, or resonance, which may be tuned, may be expressed as the following function: $V = c0/2/pi * sqrt(A/V/L)$, where $c0$ is the velocity of the sound.

The above description is meant to be exemplary only, and one skilled in the art will recognize that changes may be made to the embodiments described without departing from the scope of the disclosed technology.

The invention claimed is:

1. An engine system of a multi-engine aircraft, comprising:
   a first engine configured for operation in an active mode to provide motive power to the multi-engine aircraft, the first engine having a first bleed air system enabling operation of the first engine in the active mode;
   a second engine configured for operation in an active mode or a standby mode, the second engine having a second bleed air system enabling operation of the second engine in the active mode;
   a control system including a controller in communication with the first engine and the second engine, the controller configured to operate the second engine in either the active mode or the standby mode while the first engine operates in the active mode, wherein in the standby mode the second engine provides substantially no motive power to the aircraft;
   an air system operatively connected to the first and second bleed air systems, the air system including at least one control valve in communication with the controller of the control system, the controller actuating the control valve to selectively execute any one of: i) fluidly connect the first and second bleed air systems to each other when the second engine is in the standby mode, and ii) fluidly disconnect the first and second bleed air systems from each other when the second engine is in the active mode; and
   a pressure wave damper positioned in the air system fluidly proximate to the at least one control valve so as to attenuate at least a part of air pressure fluctuations generated in the air system during a switch over of the air system between: i) fluidly connecting the first and second bleed air systems to each other, and ii) fluidly disconnecting the first and second bleed air systems from each other;
   wherein the air system comprises a first control valve operable to selectively connect the first and second bleed air systems to each other, and the pressure wave damper is a plurality of pressure wave dampers that includes a first pressure wave damper disposed fluidly between the first control valve and the first bleed air system, and a second pressure wave damper disposed fluidly between the first control valve and the second bleed air system; and
   wherein the air system comprises a second control valve operable to selectively connect the first bleed air system to a source of pressurized air external to both the first and second engines, a third control valve operable to selectively connect the second bleed air system to the source of pressurized air, the plurality of pressure wave dampers includes a third pressure wave damper disposed fluidly between the second control valve and the first bleed air system, and a fourth pressure wave damper disposed fluidly between the third control valve and the second bleed air system.

2. The engine system of claim 1, wherein the source of pressurized air is one of: an auxiliary power unit (APU) and an air compressor.

3. The engine system of claim 1, wherein the first engine and/or the second engine is configured for standby operation in-flight.

4. The engine system of claim 1, wherein the first pressure wave damper is located at a first location proximate to the first control valve and the second pressure wave damper is located at a second location proximate to the first control valve.

5. The engine system of claim 4, wherein the first location or the second location corresponds to a pressure wave maximum experienced by an air pressure line during operation of the aircraft, the air pressure line fluidly connected the first bleed air system to the second bleed air system through the first control valve.

6. The engine system of claim 5, wherein the pressure wave maximum is calculated as a maximum air pressure in the air pressure line when the first control valve switches between one of: i) from fluidly blocking the air pressure line to fluidly unblocking the air pressure line, and ii) from fluidly unblocking the air pressure line to fluidly blocking the air pressure line.

7. The engine system of claim 1, wherein each of the plurality of pressure wave dampers is disposed at a location corresponding to a pressure wave maximum of a corresponding air pressure line.

8. The engine system of claim 1, wherein at least one of the first and second engines is configured to operate in a sub-idle mode while another one of the first and second engines is operating in the active mode.

9. The engine system of claim 1, wherein each of the first and the second engine is operable in any one of a standby mode and the active mode, and the source of pressurized air is: a) the bleed air system of the second engine when the first engine is operating in the standby mode, orb) the bleed air system of the first engine when the second engine is operating in the standby mode.

10. The engine system of claim 1, further comprising a second source of pressurized air that is external to both the first and the second engine, the second source of pressurized air being selectively fluidly connectable simultaneously to both first and the second engine.

11. The engine system of claim 10, wherein the second source of pressurized air is an auxiliary power unit of the aircraft.

12. The engine system of claim 10, wherein the second source of pressurized air is an air compressor of the aircraft.

13. An aircraft comprising the engine system of claim 1.

\* \* \* \* \*